July 4, 1967

E. HENRY-BIABAUD 3,329,153

DEVICES FOR MAINTAINING THE PRESSURE IN HYDRAULIC
CIRCUITS BETWEEN TWO GIVEN VALUES

Filed July 10, 1964

Edmond
Henry-Biabaud
Inventor

By Wenderoth, Lind and
Ponack, attorneys

3,329,153
DEVICES FOR MAINTAINING THE PRESSURE IN HYDRAULIC CIRCUITS BETWEEN TWO GIVEN VALUES
Edmond Henry-Biabaud, Paris, France, assignor to Societe Anonyme Andre Citroen, Paris, France, a corporation of France
Filed July 10, 1964, Ser. No. 381,704
Claims priority, application France, July 17, 1963, 941,719, Patent 84,166
1 Claim. (Cl. 137—108)

In the Patent No. 3,149,639 granted Sept. 22, 1964, there was described a hydraulic device which, connected between a pump and a discharge tank, supplies a load circuit at a pressure lying between two given values.

This device is contained in a main casting fixed to a pressure accumulator and comprises two slide-valves respectively sliding in two bores which open, on one side, into said accumulator and, on the other, into two distinct chambers wherein springs which counter the penetration of the slides thereinto are respectively calibrated to give way to the specified minimum and maximum values of the pressure prevailing in the accumulator.

The first slide-valve controls communication of the fluid inflow means with the tank. The second slide-valve controls communication, with the tank, of the first chamber, which chamber is in relation with the first slide-valve. The second chamber is additionally in constant communication with said tank. The fluid inflow means is in constant communication with the accumulator through a check valve.

The specific form of embodiment described in the principal patent additionally comprises a passage of small cross-section connecting the first chamber to the fluid inflow means.

The present invention has for its object a constructional form of the same invention wherein said passage of small cross-section is dispensed with, a passage of normal cross-section being provided instead between the bores of the two slide-valves in such manner that it be in constant communication with the fluid inflow duct via the bore of the first slide-valve, that it communicate with the first chamber when the second slide-valve is retracted, but that it be segregated therefrom when said second slide-valve has plunged into its bore.

A device of this kind enables the accumulator to be resupplied more rapidly when the pressure therein reaches its minimum value.

The invention will be made manifest from the embodiment thereof which will now be more particularly described, by way of example, with reference to the accompanying drawing, in which.

The device comprises a main casting G joined to the bottom of an accumulator Ac which is connected through a pipe X to the feed pump A and through a pipe Y to the load U.

Within said casting two vertical bores $U_1$, $U_2$ respectively contain two slide-valves $T_1$ and $T_2$ of cross-section $S_1$ and $S_2$ respectively. The lower ends of these bores open into chambers $E_1$ and $E_2$ wherein springs $R_1$ and $R_2$ exert against the lower ends of slide valves $T_1$, $T_2$ upwardly directed forces which, in the uppermost position of said slide-valves, are of magnitudes $F_1$ and $F_2$ respectively.

Said springs are so adjusted that, if $Pc$ and $Pd$ be taken to designate the lower and upper limit values between which the pressure in the accumulator must be maintained, the values of $F_1$ and $F_2$ be given by the formulae:

$$F_1 = Pc \times S_1$$

and $$F_2 = Pd \times S_2$$

The slide-valve $T_1$ is connected into the duct Z between the fluid inlet pipe X and the discharge tank B and acts in Z as a valve which is closed in its uppermost position and open in its bottommost position.

Figure 2:
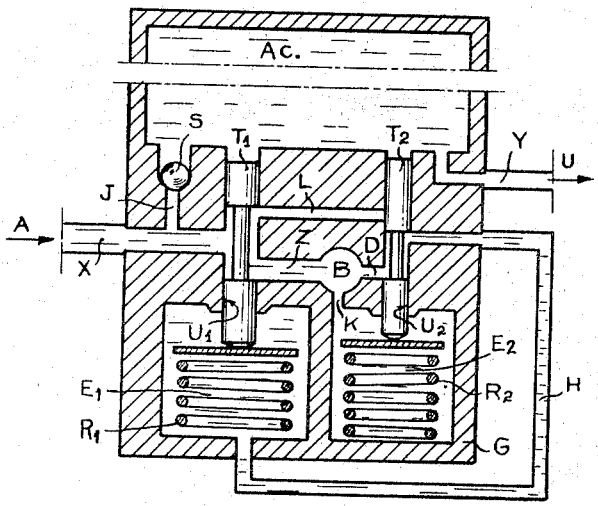
FIGURE 2 is a sectional view of the same when the pressure in the accumulator reaches its upper limit value.
Figure 3:
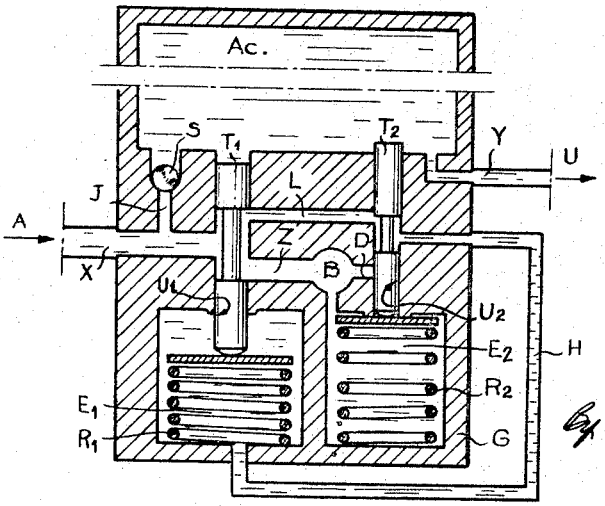
FIGURE 3 shows the configuration of the device of FIGURES 1 and 2 when the pressure in the accumulator drops once more from its upper limit to its lower limit.

The bore $U_1$ of the first slide-valve $T_1$ communicates with the fluid feed pump A through the pipe X, with the discharge tank B through the duct Z, and with a third duct L. When $T_1$ is raised (see FIGURE 1), X communicates with L only. When $T_1$ is lowered (see FIGURES 2 and 3), X communicates with both L and Z.

The bore $U_2$ of the second slide-valve $T_2$ communicates with the first chamber $E_1$ through the pipe H, with the discharge tank B through the duct D, and with the duct L. When $T_2$ is raised (see FIGURES 1 and 3), H communicates with L only. When $T_2$ is lowered (see FIGURE 2), H communicates with B only. As is clearly shown, in the specific form of embodiment of the invention which is the subject of the present continuation-in-part, the first chamber $E_1$ is in direct communication only with the bore $U_1$ (the small-section duct F provided in the constructional form described in the principal patent being dispensed with in this case).

The second chamber $E_2$ communicates directly with the discharge tank B through the duct K.

The device hereinbefore described functions in the following manner:

When the system is set under pressure (see FIGURE 1), the two slide-valves $T_1$ and $T_2$ are urged upwardly by their respective springs $R_1$ and $R_2$.

The fluid issuing from A cannot flow into B through D, which is closed, and therefore passes upwardly through the check-valve S and into the accumulator Ac within which the pressure P gradually rises.

Said fluid simultaneously fills the chamber $E_1$ at the same pressure P, via the ducts L and H, the slide-valve $T_2$ isolating D and causing L and H to intercommunicate.

Figure 1:
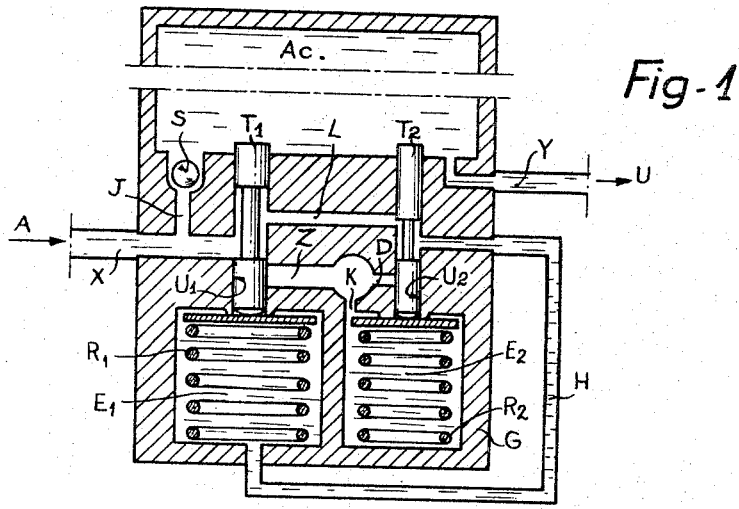
FIGURE 1 is a vertical section of a device according to the invention in the functional configuration wherein the pump is feeding into the accumulator.

As long as the pressure P in Ac and in $E_1$ remains below $Pd$, the two slide-valves $T_1$ and $T_2$ will remain in the positions they occupy in FIGURE 1.

This will be readily obvious in regard to $T_2$, since $P < Pd$ results in $P \times S_2 < Pd \times S_2$, which means that the force $P \times S_2$ exerted by the fluid contained in Ac against the upper face of $T_2$ is smaller than the countering force $F_2 = Pd \times S_2$ exerted by the spring $R_2$ against the lower face of $T_2$ (having regard for the fact that $E_2$ constantly discharges through the duct K).

However, the slide-valve $T_1$ also remains in its uppermost position due to its receiving on its upper face the force $P \times S_1$ exerted by the fluid contained in Ac and, against its lower face, the same force $P \times S_1$ (the chamber D being filled with fluid at a pressure P) augmented by the force $F_1$ of the spring $R_1$.

When the pressure P in Ac attains and slightly exceeds the upper limit $Pd$, the slide-valve $T_2$ descends (since the downward pressure $Pd \times S_2$ counterbalances the force $F_2 = Pd \times S_2$ of the calibrated spring $R_2$).

As a result, the duct L is masked and the chamber $E_1$ is instantly caused to discharge through H and D.

Because the force $Pd \times S_1$ exerted against the upper face of $T_1$ is greater than the force $F_1 = Pc \times S_1$ exerted by the spring $R_1$ against the lower face thereof (since the relation $Pd>Pc$ results in $Pd \times S_1 > Pc \times S_1$), the slide-valve $T_1$ also descends (see FIGURE 2), thereby causing the feed pump A to communicate directly with the discharge tank via the duct Z.

The check-valve S then closes and the pressure in Ac immediately begins to drop through the fluid flowing toward the load U.

This in turn immediately causes the slide-valve $T_2$ to rise. The slide-valve $T_1$, however, remains lowered (FIGURE 3) as the pressure in the chamber $E_1$ remains null due to the fact that the pressure at the feed point A, with which said chamber is placed in communication once more, is itself null.

As long as P is greater than Pc, it is manifest that $P \times S_1 > Pc \times S_1$, so that the resultant of the forces acting on $T_1$ is directed downwardly.

As soon as P reaches the lower limit Pc, the slide-valve $T_1$ rises anew and the accumulator Ac is placed in communication again with the feed pump A, the device being then in the configuration of FIGURE 1 once more and the cycle described hereinabove repeating itself automatically.

I claim:

A device for maintaining between two limit values the pressure at the inlet end of hydraulic load circuits, operating in conjunction with a delivery of fluid under pressure from a source of supply comprising a casing, a pressure accumulator in said casing having an inlet and an outlet to said load circuits, a discharge tank, a passage connecting said inlet to said discharge tank, two chambers in said casing, two bores, each of said bores having an opening on one side to said accumulator and on the other side into one of said chambers, a first and a second slide valve sliding in said bores, a calibrated spring in each chamber opposing penetration of its associated slide valve thereinto in response to the force exerted by the fluid compressed in said accumulator, said first slide valve controlling said passage connecting said inlet to said discharge tank, a passage connecting the chamber in which said first slide valve is positioned to said discharge tank, said second slide valve controlling said last named passage and said bores being interconnected through an additional passage which is constantly in communication with said inlet and communicates with said chamber having said first slide valve when said second slide valve is raised but which is shut off therefrom when said second slide valve is lowered.

References Cited
UNITED STATES PATENTS 3,149,639   9/1964   Henry-Biabaud _____ 137—108

WILLIAM F. O'DEA, *Primary Examiner.*

D. J. ZOBKIW, *Assistant Examiner.*